US005410371A

United States Patent [19]

Lambert

[11] Patent Number: 5,410,371
[45] Date of Patent: Apr. 25, 1995

[54] DISPLAY SYSTEM EMPLOYING ACOUSTRO-OPTIC TUNABLE FILTER

[75] Inventor: James L. Lambert, Sunland, Calif.

[73] Assignee: The United States of America as represented by the Administrator of the National Aeronautics and Space Administration, Washington, D.C.

[21] Appl. No.: 73,235

[22] Filed: Jun. 7, 1993

[51] Int. Cl.6 .............................. H04N 5/74
[52] U.S. Cl. .................... 348/769; 348/754; 359/285
[58] Field of Search ........ 358/55, 56, 57, 60, 358/61, 62, 63, 201, 202, 199, 235, 230, 231; H04N 5/74, 9/31, 9/14; 359/285, 298, 305, 218, 219, 306, 308, 309; 348/739, 742, 744, 754, 769, 764, 770

[56] References Cited

U.S. PATENT DOCUMENTS

| | | | |
|---|---|---|---|
| 3,657,473 | 4/1972 | Corcoran | 358/201 |
| 3,783,185 | 1/1974 | Spaulding | 358/63 |
| 4,093,976 | 6/1978 | Das | 348/769 |
| 4,244,005 | 1/1981 | Jürgensen | 358/201 |
| 4,611,245 | 9/1986 | Trias | 358/60 |
| 4,720,747 | 1/1988 | Crowley | 358/60 |
| 4,851,918 | 7/1989 | Crowley | 358/235 |
| 4,902,082 | 2/1990 | Okabayashi et al. | |
| 5,003,300 | 3/1991 | Wells | |
| 5,035,474 | 7/1991 | Moss et al. | |
| 5,040,058 | 8/1991 | Beamon, III | |
| 5,091,719 | 2/1992 | Beamon, III | |
| 5,105,304 | 4/1992 | Tanaka et al. | 359/287 |
| 5,107,363 | 4/1992 | Matsui et al. | 348/769 |
| 5,153,569 | 10/1992 | Kawamura et al. | |
| 5,166,778 | 11/1992 | Beamon, III | |
| 5,170,153 | 12/1992 | Migozzi et al. | |
| 5,253,073 | 10/1993 | Crowley | 358/235 |

Primary Examiner—James J. Groody
Assistant Examiner—Michael H. Lee
Attorney, Agent, or Firm—John H. Kusmiss; Thomas H. Jones; Guy M. Miller

[57] ABSTRACT

An acousto-optic tunable filter (AOTF) is employed to generate a display by driving the AOTF with an RF electrical signal comprising modulated red, green, and blue video scan line signals and scanning the AOTF with a linearly polarized, pulsed light beam, resulting in encoding of color video columns (scan lines) of an input video image into vertical columns of the AOTF output beam. The AOTF is illuminated periodically as each acoustically-encoded scan line fills the cell aperture of the AOTF. A polarizing beam splitter removes the unused first order beam component of the AOTF output and, if desired, overlays a real world scene on the output plane. Resolutions as high as 30,000 lines are possible, providing holographic display capability.

14 Claims, 3 Drawing Sheets

DISPLAY SYSTEM EMPLOYING ACOUSTRO-OPTIC TUNABLE FILTER

ORIGIN OF THE INVENTION

The invention described herein was made in the performance of work under a NASA contract, and is subject to the provisions of Public Law 96-517 (35 U.S.C. § 202) in which the Contractor has elected not to retain title.

TECHNICAL FIELD

The subject invention relates to display technology and, more particularly, to a display system employing an acousto-optic tunable filter and capable of virtual, stereo, or holographic color imaging.

BACKGROUND ART

New types of display systems have recently been developed which can provide capabilities of heads-up viewing, virtual imaging from a compact system, and fully animated computer-generated holographic imaging. Unfortunately, all of these systems are monochrome and have been designed with a single advanced display feature in mind.

The most common type of heads-up display is currently being used on jet fighters (and even in some automobiles) to provide a means of overlaying portions of the instrument panel onto the user's normal visual field. Typically the user observes his surroundings by looking through a holographic optical element (HOE) mounted near the windshield. A very high intensity, taut shadow mask CRT, usually mounted on the ceiling of the aircraft, is used to illuminate the HOE which, in turn, reflects the display onto the eyes of the user. The HOE is designed with optical power such that a virtual image of the graphics display is formed in front of the user. The Bragg angle of the HOE is selected such that the particular wavelength of light emitted by the CRT is reflected toward the user, while at all other wavelengths the HOE acts as a transparent window. The projected image from the CRT appears to overlay the input scene and thus allows the pilot to fly more proficiently.

These types of HOE are typically fabricated from dichromated gelatin (DCG), and can be designed to have extremely high diffraction efficiency (>99%), while remaining nearly perfectly clear (<1% absorptive) at other wavelengths in the visible spectrum. The disadvantages of DCG HOEs are that the gelatin layer can shrink over time and that, in conditions of high humidity, the HOE can become fogged. Recently du Pont has introduced several different types of organic photopolymers which can be used to produce HOEs that retain all of the advantages of DCG but are much easier to fabricate, do not shrink, and are not degraded by humidity.

Although, from an engineering standpoint, this type of display technology is quite mature, it does have a number of shortcomings. Implementation of a color display would be very difficult using this scheme since the three color bands reflected toward the user would be removed from the input scene in transmission. In addition, representation of 3D imagery via real-time computer-generated holography is clearly impossible due to resolution limits imposed by the CRT.

Helmet-mounted displays (HMD) are similar in function to heads-up displays, but they allow the user to see the displayed information regardless of how the user moves his head. Most versions of the HMD are used exclusively to present 3D virtual reality visualization sequences for use in flight simulators. Such systems are being developed to train both military pilots as well as astronauts. These systems operate by utilizing a pair of liquid crystal light valves (LCLV) to protect the imagery through optical fiber bundles to transfer high resolution stereo imagery to the user via helmet-mounted optics. Although such HMD displays provide excellent resolution and stereo vision capability, the electronic support system required to implement this type of display system is quite large.

One of the most interesting implementations of an HMD is manufactured by Reflection Technologies and is now available commercially. A simple and compact architecture is used to implement a 12-inch monocular virtual display which appears to float in front of the user. The virtual screen can be placed at distances from nine inches to infinity by adjusting an intermediate focusing lens. By adjusting this distance to match that of the surroundings, the virtual screen observed by the left eye and the surroundings observed by the right eye will merge by a process called fusion. The system employs conventional optics to meet most of the power, size, and weight requirements of an embedded microsystem. A vertically-mounted array of light-emitting diodes (LEDs) is used to sequentially display columns of the output image. A voice coil actuated scanning mirror is used to sweep the image of the LED array across the visual field to form the output image. Application specific integrated circuits (ASICs) and flexible printed circuit material enable the system to fit into its 1.1×1.2×3.2-inch, battery-operated package, requiring only $\frac{1}{8}$-watt of power. However, the display has some shortcomings, namely that it is monochrome and has only 720×280 pixel resolution. In its current implementation, the system is designed to interface with IBM compatible personal computers via a computer graphics adapter (CGA). Although somewhat limited in capability, the Reflection Technologies design is the most practical system developed to date for application to an embedded microsystem.

Recently the MIT Media Laboratory demonstrated a high resolution optical scanning system which has the capability of displaying computer-generated holographic images at video frame rates. The scanner architecture utilizes a tellurium dioxide ($TeO_2$) AO Bragg cell in conjunction with a rotating polygon mirror to produce a scanned output image with extremely high horizontal resolution. Collimated input light from a 10 mW helium neon laser is used to illuminate a Bragg cell, which, in response to a 50-MHz real-time video input signal, proportionally diffracts light into a spatially-varying first-order output. The output from the Bragg cell is focused onto an 18-sided rotating polygon scanning mirror, which spins in the opposite direction of acoustic propagation to exactly cancel the acoustic fringe pattern traveling through the cell. The overall effect is a synthetic aperture with a time bandwidth product (TBWP) equal to the product of the number of sides on the polygon times the TBWP of the cell (18×40 $\mu$s×50 MHz=32,000 resolvable points). An oscillating scan mirror is used to position each horizontally-oriented 720-$\mu$s synthetic aperture to the correct position in the output plane. Since a 40-MHz frame rate was utilized (25 ms/frame), the vertical resolution of the display is limited to just 25 ms/(18×40 μs)=35 lines. It has been asserted that vertical resolution can be sacrificed because most depth information is perceived from a pair of horizontally-oriented eyes. It seems clear, however, that future holographic display systems must have increased vertical resolution to be practical. Disadvantages of the MIT approach are: (1) it requires a moving mirror, (2) the image is limited to monochrome, (3) real world scenes cannot be superpositioned with the virtual image, and (4) a high-bandwidth data pipe is needed to play the image in real-time.

The principal difference between a high-resolution display and a holographic display is that the holographic display must possess sufficient spatial bandwidth to reproduce the complex light interference patterns originating from an object. This implies pixel spacing of 1 μm or less. For a 3-cm×3-cm square display, this would result in 30K×30K=900M elements. Adding video frame rates and color would generate more than 81 GB/s of data throughput. Applying standard JPEG near-lossless compression would reduce this to about 8.1 GB/s—still much higher than most supercomputers can generate today.

Personal virtual display systems now available, or being studied in various research laboratories, suffer from poor resolution, are constructed using many moving parts, and are difficult to implement in full color. In addition, currently-available holographic display systems require enormous communication channel bandwidth and have large power demands. Furthermore, many of the conventional display technologies commonly used today (CRT, LCD, plasma) are not easily extendable to support holographic resolution and full color. Thus, a new optical display approach is required that suffers from none of these disadvantages.

STATEMENT OF THE INVENTION

It is therefore an object of the invention to provide a single display architecture and apparatus providing tunable color display capability and capable of yielding compact virtual, stereo, or full holographic displays.

It is another object of the invention to provide an advanced display system capable of presenting real-time virtual, holographic, and/or stereo color imagery.

It is another object of the invention to provide a display system amenable to low-power VLSI implementation.

These and other objects are achieved, according to the invention, by employing an acousto-optic tunable filter (AOTF) as both a spectral filter and spatial light modulator. In order to achieve this operation, the AOTF is driven by an RF electrical signal comprising modulated red, green, and blue video signals. A linearly polarized, pulsed light beam is scanned across the AOTF, causing color video columns (scan lines) of an input video image to be encoded into vertical columns of the AOTF. Pulsing the light beam permits the AOTF to be illuminated periodically as each acoustically-encoded scan line fills the cell aperture of the AOTF. A polarizing beam splitter is preferably employed to remove the unused first order beam component and, if desired, to overlay a real world scene on the output plane. Resolutions as high as 30,000 lines are possible, providing holographic display capability.

Another novel aspect according to the invention is the use of the AOTF to modulate the spectral output of a laser by diffracting portions thereof into the first order and using the zero order output of the AOTF in forming the display.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

DETAILED DESCRIPTION OF THE INVENTION

The following description is provided to enable any person skilled in the art to make and use the invention and sets forth the best modes contemplated by the inventor of carrying out his invention. Various modifications, however, will remain readily apparent to those skilled in the art.

AOTF devices have been utilized as electronically-programmable optic band-pass filters, most often employed in nonimaging systems for performing low to medium resolution spectroscopy. A number of investigators have utilized AOTF devices in imaging systems, such as fluorescence microscopes and imaging spectrometers since Hecht, Chang, and Boyd demonstrated that AOTF devices can image with spatial resolutions exceeding 100 line pairs per mm.

In the preferred embodiment, an AOTF is used in a new application, as both a spectral filter and a spatial light modulator (SLM), to implement an advanced display system capable of presenting real-time virtual, holographic, and/or stereo color imagery.

Figure 1:
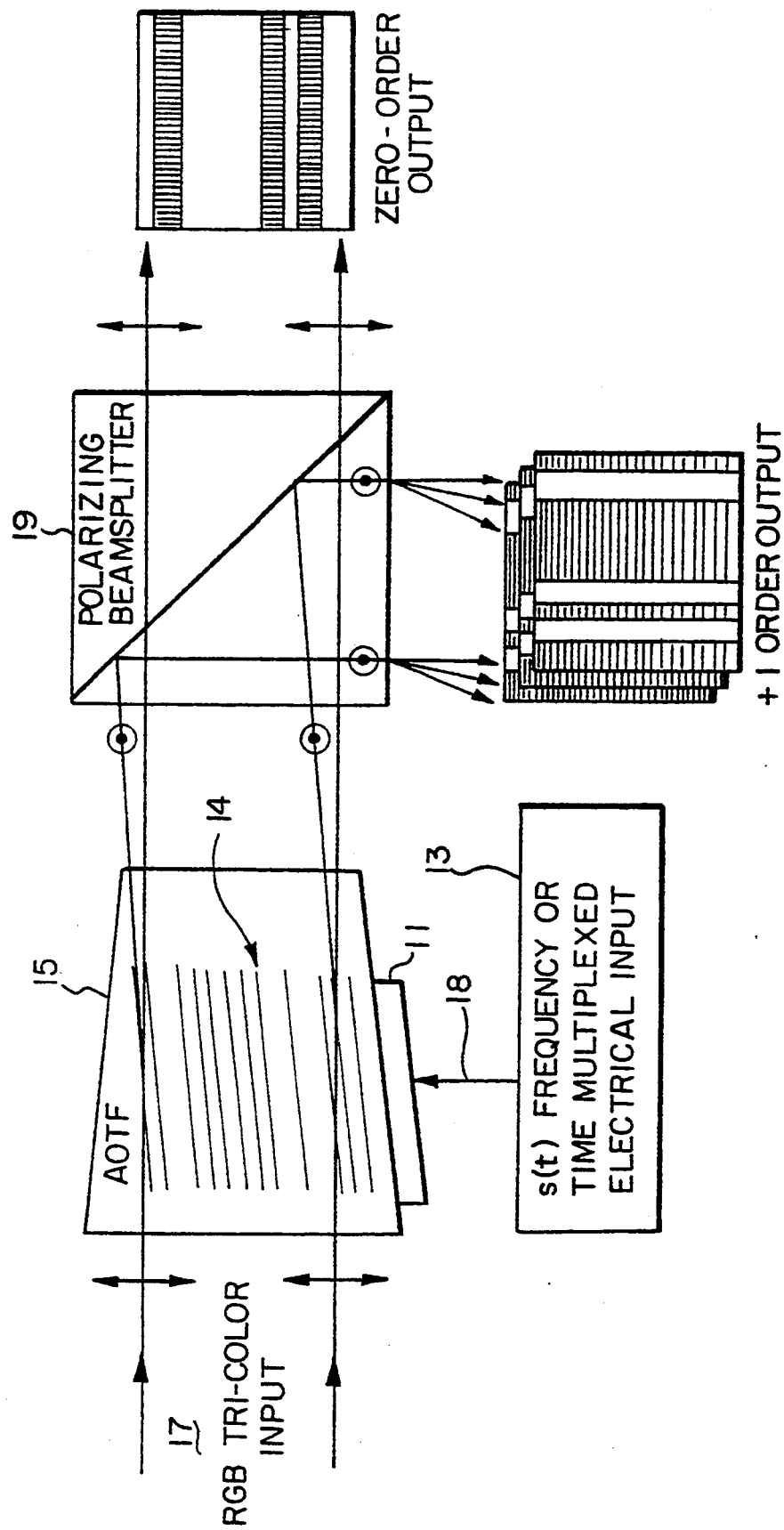
FIG. 1 is a schematic diagram illustrating an AOTF device configuration.

The AOTF is a solid state electronically-tunable spectral band-pass filter which operates on the principle of acousto-optic interaction in an anisotropic medium. A diagram describing the device's construction is shown in FIG. 1. A thin piezoelectric transducer 11, driven by an electrical radio frequency (RF) source 13, is used to launch either longitudinal or shear acoustic waves 14 into a bulk acousto-optic crystal 15. The induced acoustic wave 14 propagates through the bulk medium 15 and modulates the index of refraction in the medium. Light 17 entering the AOTF 15 interacts with the acoustic field such that light within a narrow passband of the device 15 is diffracted into +1 and −1 orders. That light which is not diffracted, termed the zero-order beam, will simply pass nondiffracted through the device 15. Whether the input light 17 within the passband of the device 15 is diffracted into the +1 or −1 order depends on the polarization of the input 17. As shown in FIG. 1, incident passband light 17 which is polarized in the plane of the page will be rotated to the orthogonal polarization (due to the acousto-optic interaction) and will be diffracted only into the +1 order. (Incident light linearly polarized out of the plane of the page would be diffracted into the −1 order.) Typically, the angular separation between the first and zero-order beams is only a few degrees. Thus, according to the preferred embodiment, a polarizing beam splitter 19, also shown in FIG. 1, is used to separate the +1 and zero-order beams.

The transducer 11 is usually driven with an RF input of a single frequency. In this case, a diffracted beam of a spectrally narrow band of light is diffracted into the first order, whose central wavelength corresponds to the frequency of the RF source. If an RF source 13 providing a multiple frequency signal s(t) on input 18 is utilized, then a corresponding spectra in the first-order output results. Thus, the AOTF 15 can be used to implement a spectral filter which has many time-varying spectral passbands or, for that matter, any arbitrary transmission function by selecting a suitable RF input 18. Although the exact relationship between an RF frequency component $f_c$ and the corresponding diffracted wavelength $\lambda$ is best calculated by utilizing wave vector momentum matching diagrams derived from coupled mode analysis, an approximate relationship is given by:

$$f_c = \frac{V_a \Delta n}{\lambda} \sqrt{\sin^4 \theta_i + \sin^2 2\theta_i}, \quad (1)$$

where $\Theta_i$ is the angle between the normal to the incident face and c-axis of a crystal with birefringence $\Delta n$ and acoustic velocity $V_a$.

In 1974, I. C. Chang advanced a noncollinear AOTF design which provided a noncritical phase matching (NPM) condition between the incident and acoustic beams. This led to the fabrication of AOTF devices with angular apertures as large as 40 degrees. The noncollinear NPM design also gave rise to extremely power efficient TeO$_2$ devices, which were not amenable to the collinear design invented much earlier. The choice of $\Theta_i$ and $\Theta_a$ (measured with respect to the c-axis) is critical to the design of a noncollinear NPM AOTF. For $\Theta_i$ less than 30 degrees, which is appropriate for AOTFs operating in the visible and near infrared spectral ranges, the NPM condition can be met by choosing:

$$\theta_a = \theta_i/2 + 90 \text{ degrees.} \quad (2)$$

The display system according to the preferred embodiment both spatially and color encodes columns of an input video image by driving an AOTF device 15 with an RF signal s(t) comprised of the sum of three separate modulated RF carriers, such that:

$$s(t) = r(t)\sin(2\pi f_r(t)) + g(t)\sin(2\pi f_g(t)) + b(t-)\sin(2\pi f_b(t)), \quad (3)$$

where r(t), g(t), and b(t) are the red, green, and blue video signals, and the frequency of each carrier oscillator $f_r$, $f_g$, and $f_b$ is selected to correspond to the red, green, and blue (RGB) spectral lines of the input source supplied, for example, by a helium cadmium (HeCd) "white light" laser. By utilizing an RGB optical source 17 which is linearly polarized in the plane of the page, a proportional amount of red, green, and blue light will be diffracted into the +1 order in response to electrical input signals r(t), g(t), and b(t):

$$I_{+1}(t,x) = R(t - x/V_s) + G(t - x/V_s) + B(t - x/V_s), \quad (4)$$

where $I_{+1}(t,x)$ is the intensity of +1 order output beam, $V_s$ is the velocity of sound in the crystal, and R, G, B are the intensities of the red, green, and blue components. Note that each spatially-encoded acoustical wave moves through the cell with acoustic velocity $V_s$. Thus, the laser source 17 must be pulsed every $T_a$ seconds to allow each acoustically-encoded video line to span the aperture of the cell and diffract light into the output plane.

Figure 2:
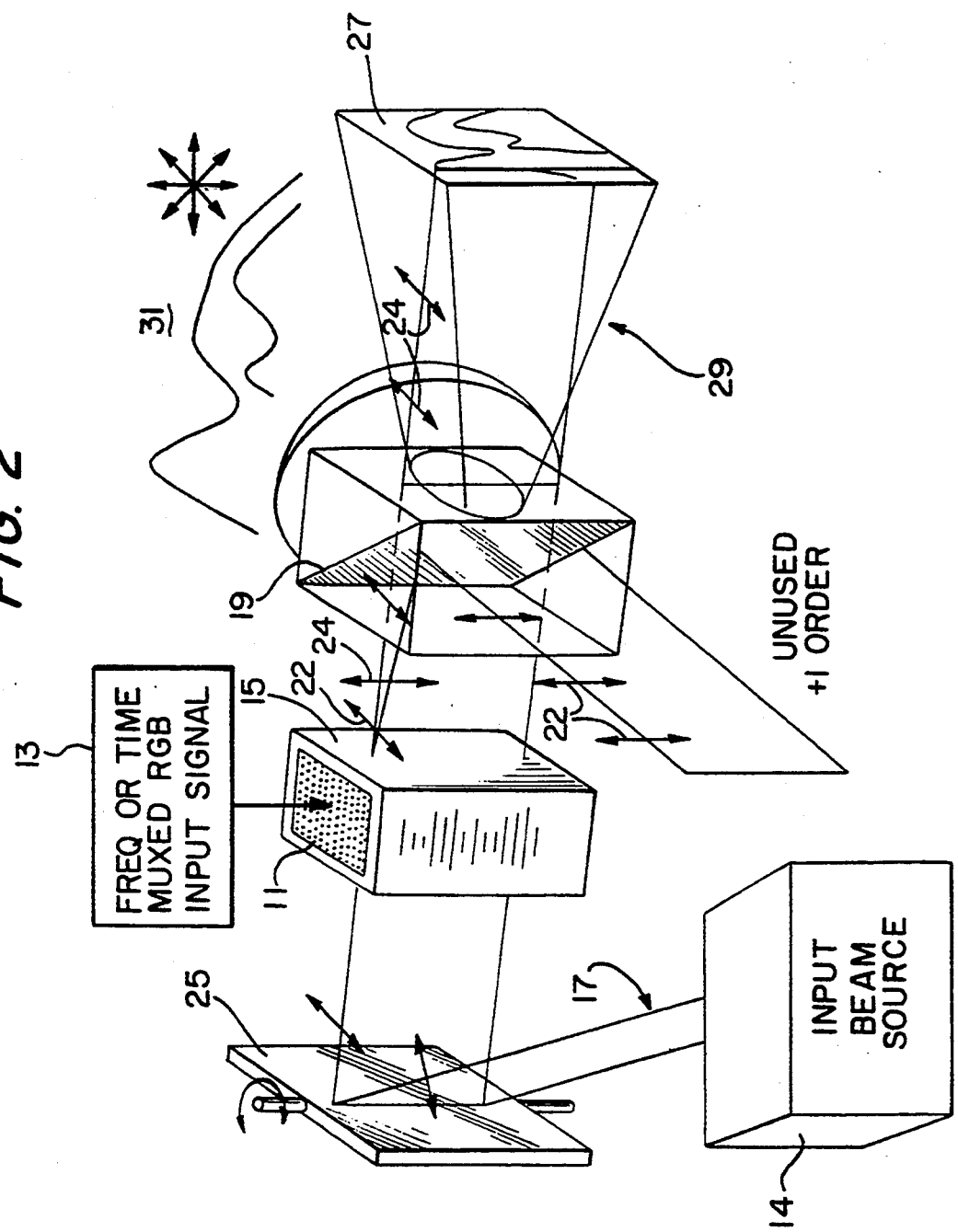
FIG. 2 is a structural block diagram of an AOTF device configured as a spectral filter and spatial light modulator according to the preferred embodiment.

As shown in FIG. 2, a scanning mirror 25 is used in conjunction with the AOTF 15 to horizontally map, via the beam splitter 19, the color-encoded scan lines 29 into the two-dimensional output plane 27. The input beam source 14 provides an RGB collimated linearly (horizontal) polarized, pulsed input light beam 17 to the scanning mirror 25. Arrows 22, 24 illustrate horizontal and vertical polarization, respectively, at various points in the display system of FIG. 2.

The relationship between the amplitudes of r(t), g(t), and b(t) and the intensity of the corresponding colors diffracted is nonlinear and is, in general, given by:

$$\eta_r(x,t) = \sin^2(ar(t)),$$
$$\eta_g(x,t) = \sin^2(ag(t)), \quad (5)$$
$$\eta_b(x,t) = \sin^2(ab(t)).$$

where $\eta_r$, $\eta_b$, and $\eta_b$ are the diffraction efficiencies of the red, green, and blue wavelengths, and $\alpha$ is a material dependent constant relating the electrical-to-optical conversion efficiency. Usually the intensity mode operation is achieved by linearizing the arguments of equation (5) around $\pi/4$ and operating at around 50% diffraction efficiency (DE). Since 50% DE is unacceptable for this application, look-up tables are preferably utilized to linearize the relationship between diffracted light and the respective, r, g, b driving signals.

Since material dispersion of many acousto-optic materials is significant in the visible region (most notably TeO$_2$), the internal diffraction of the first-order red, green, and blue beams will not be exactly congruent. This would ordinarily lead to vertical convergence problems in the output plane. To alleviate this problem, the zero-order beam is utilized to carry the spatial/spectral encoded information to the output plane 27, since the red, green, and blue light diffracted into the +1 order at slightly diffracted angles is removed from the zero-order beam collinearly. By spherically grinding the input and output faces of the AOTF 15 such that the horizontally-scanned beam is always normal to the tangent of the front and back faces, convergence problems can be virtually eliminated. This approach is particularly appropriate for highly efficient AOTF devices. (AOTFs fabricated from TeO$_2$, for example, typically have maximum DEs greater than 90%.)

The architecture depicted in FIG. 2 uses a simple polarized beam splitter 19. It further employs conventional optics, omitted for clarity, to create the RGB collimated beam 17. The architecture merges, for example, computer-generated graphics onto a real world input scene 31. The polarizing cube 19 is also used to separate the +1 diffracted orders from the zero-order output beam 29. Shuttering of the real world scene 31 can be provided by using a liquid crystal display behind the beam splitter to selectively block regions of the input scene 31.

The maximum vertical resolution of the display system shown in FIG. 2 is given by the time bandwidth product (TBWP) of the AOTF, i.e., the product of the transit time across the AOTF aperture 15 (limited by acoustic attenuation) and the RF bandwidth of the device 15 (limited by the transducer). A typical AO device has a TBWP of 2,000. Thus, 2,000 points can be resolved along its aperture. However, with AOTF devices driven with a r(t), g(t), b(t) modulated carrier, the available bandwidth must be divided by three. Thus, for most devices, the maximum monochrome resolution will be limited to 2,000, and the maximum vertical color resolution will be limited to 666. Some new devices, potentially with very large TBWP, may be available in the near future.

Assuming that system optics is a nonlimiting factor on resolution, the maximum horizontal resolution can be calculated by dividing the desired frame time by the aperture time of the cell. Since the acoustic velocity of AO materials is widely varied, a large range of horizontal resolutions is possible and can be achieved in most cases without sacrificing vertical resolution. For example, an AOTF fabricated from $TeO_2$ operating with a slow shear transducer has a typical aperture time of 50 $\mu s$ and a bandwidth of 40 MHz. Thus, the maximum vertical resolution is 2,000/3=666, and the maximum horizontal resolution with a 33-ms frame time (30 frames/sec) is 33 ms/50 $\mu s$=660. Although these resolutions seem fairly modest, the system is, in principal, limited by the type of AOTF used. $TeO_2$ provides extremely high diffraction efficiency/RF watt. For example, it is estimated that less than 100 mW of drive power is required to produce greater than 95% diffraction efficiency across the free spectral range spanning the primary colors (441 nm–636 nm) for a device utilizing a 10-degree design angle, with a 4×2 mm transducer. Since such a design produces a passband resolution of 25 nm, sufficient to separate the three primary colors, the transducer size can theoretically be specified even smaller and, hence, require even less input power.

Lithium niobate ($LiNbO_3$) devices are also available, with a bandwidth of 2 GHz and an aperture time of 1 $\mu s$. In this case, the vertical resolution is the same, but the horizontal resolution is 33 ms/1 $\mu s$=33,000 lines. Holographic displays can be realized by using a scanning system with extremely high resolution. Vertical resolution can be sacrificed, since depth perception is perceived primarily due to parallax in the horizontal resolution. Therefore, by utilizing a lithium niobate device, holographic display resolutions (in the horizontal dimension) can be achieved.

The tradeoff between lithium niobate and $TeO_2$ devices is between relative diffraction efficiency and maximum horizontal resolution. The figure of merit, $M_2$, relating the percent DE per RF watt of input power for $TeO_2$, is 795 versus 4.6 for lithium niobate.

For AOTF devices with extremely short aperture times such as lithium niobate, very high vertical resolution can be achieved by time multiplexing, rather than frequency multiplexing, the red, green, and blue signals. Thus, by driving the display at 90 fps and displaying red, green, and blue frames in rapid succession, a maximum color resolution of 11,000×2,000 can be achieved.

$LiNbO_3$ AOTF devices are appropriate to implement displays which can be used to display computer-generated holograms (CGHs), because of their inherently high bandwidths and small aperture times. ($LiNbO_3$ devices are nominally the same physical length as $TeO_2$ devices.)

In a heads-up display, the device of the preferred embodiment scans imagery directly onto the retina in such a way that the lens of the eye is free to focus on other objects in its field of view. Thus, in an airplane cockpit, the pilot could look far to the horizon or immediately in front of him, and the overlaid scanned display would always remain in focus. (This occurs because the heads-up display data is scanned through the center of the interocular lens and, hence, is not refracted by it, while normal imagery is refracted normally.)

Figure 3:
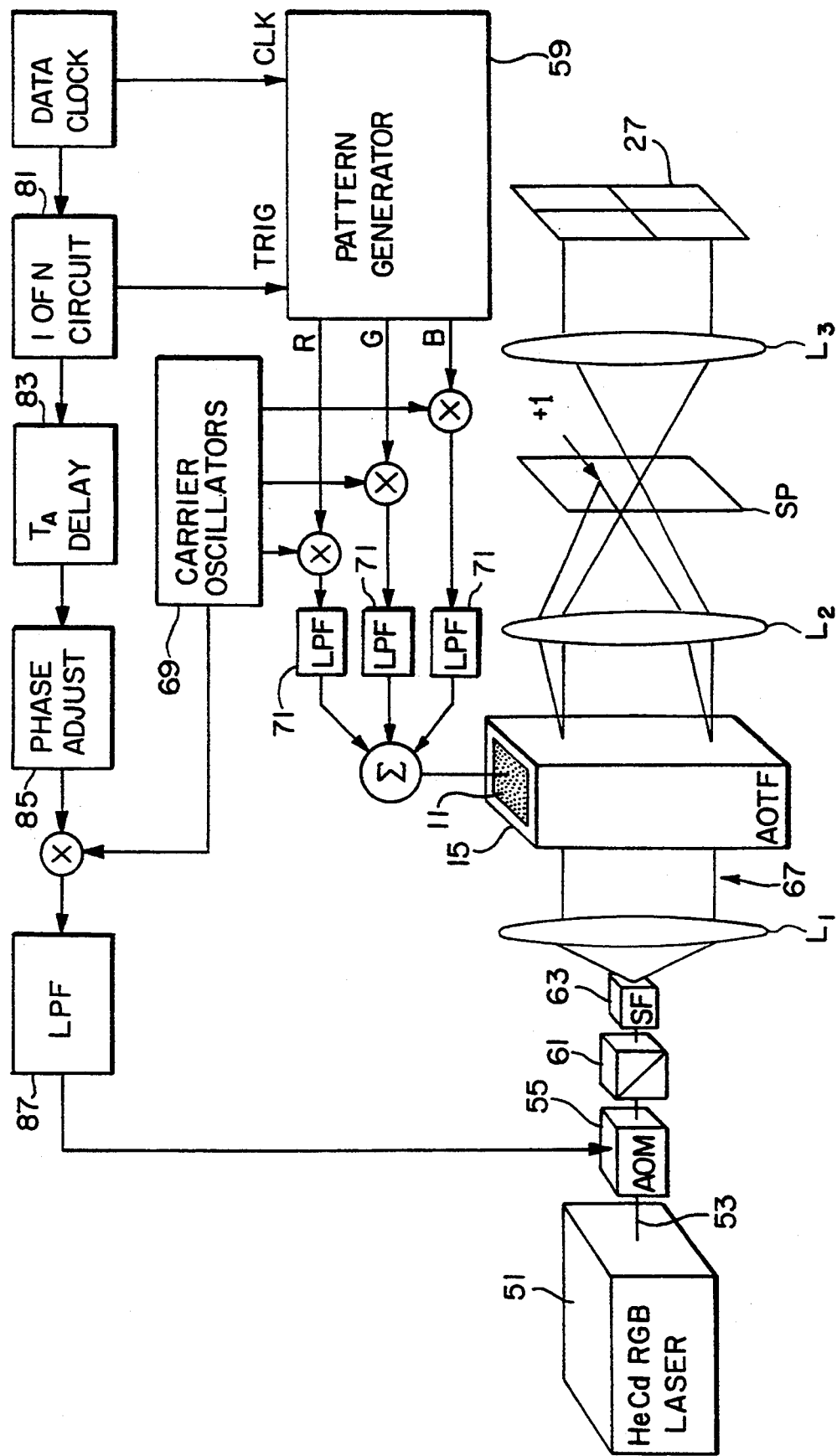
FIG. 3 is a schematic block diagram of an alternate embodiment.

FIG. 3 shows a system using a HeCd hollow cathode laser 51 to supply an RGB tricolored output. The HeCd laser 51 provides red (636.0 nm or 635.5 nm), green (533.7 nm or 537.8 nm), and blue (441.6 nm) spectral lines simultaneously with 100:1 linear polarization. The input beam 53 is fed through an AO modulator 55 to pulse the beam synchronously with the arrival of an acoustically encoded line of video information from a pattern generator 59. Since a linear polarized output is required, a polarizing element such as a polarizing beam splitter PBS 61 may be required, depending on the modulator used (i.e., AOTF point modulator or Bragg cell, in which the output light is of circular polarization). This output is collimated with spatial filter (SF) 63 and achromatic lens $L_1$. The collimated output 67 of achromatic lens $L_1$ is masked (not shown) into a rectangular region and used to illuminate a $TeO_2$ AOTF 15. Achromatic lenses $L_2$ and $L_3$ are used to image the zero-order beam to the output plane 27. A sheet polarizer SP is placed in the Fourier plane to eliminate the first-order beam from the output. (The use of the polarizer in the Fourier plane, rather than a spatial filter, selectively allows the portions of the angular spectrum of the zero-order which overlap the first-order beam to pass through the system.) A mask in the output plane (not shown) is used to block all light except that which passes through a vertical line through the center of the AOTF 15.

Three separate carrier oscillators 69 are used to allow the AOTF 15 to implement spectral band-pass filters 71 centered around 636.0 nm, 533.7 nm, and 441.6 nm. For the 10-degree $TeO_2$ AOTF model, the aforementioned RGB wavelengths correspond to RF frequencies of 52.4 MHz, 65.4 MHz, and 85.7 MHz, respectively. A three-channel pattern generator 59 generates the RGB data streams. The outputs of the carrier oscillators 69 are mixed with each respective RGB frequency. Each of these outputs is low-pass filtered (LPF) in order to select the lower sideband mixer output, and then summed to produce the AOTF driving signal. Note that the frequency of each carrier is adjusted such that the center frequency of each lower sideband corresponds to the required RGB AOTF RF frequencies of 52.4 MHz, 65.4 MHz, and 85.7 MHz.

A divide by N circuit 81, where N corresponds to the video line data length (for the frequency multiplexed case), is used to trigger the output of the data generator. A version of this signal, delayed by delay unit 83, is used to pulse the acousto-optic modulator 55 (AOM) $T_A$ microseconds (where $T_A$ corresponds to the aperture time of the AOTF) after each video line is output. This delay provides sufficient time for the acoustically represented data to be distributed across the AOTF aperture. The delayed signal output from phase adjuster 85 is mixed with the carrier oscillator frequency and by a multiplier, resulting in sum and difference frequency components. The LPF 87 selects the difference frequency to gate the AOM 55.

As may be appreciated, the preferred embodiment provides an advanced display system capable of virtual, stereo, and/or holographic imaging.

The preferred embodiment finds application in various displays including heads-up and helmet-mounted displays, as well as light show projection systems and laser ophthalmoscopes.

Low power VLSI implementations of the display preprocessing functions such as data compression, display formatting, and timing are necessary for producing a portable, miniature display system suitable for use in a distributed tactical environment.

Such a display may unobtrusively provide infantry soldiers with a variety of graphics-based information, including cartographic map data, target-designating overlay planes, real-time infrared surveillance imagery, and video imagery for guiding semiautonomous combat vehicles. Such a display system enables user to overlay high resolution holographic, raster, and vector-based graphical-based tactical information onto their normal visual field by back-projecting imagery onto the eyes of the user to provide the illusion of a full-size computer display.

Other applications of the preferred embodiment include: (a) supercomputer visualization displays which overlay multiple data set computed visualizations in one 3D rendered image (e.g., wind, temperature, and pressure all on one image with false colors); (b) multispectral binoculars that will allow a soldier—or forest ranger—to simultaneously see the entire visible, infrared, microwave, and millimeterwave spectrum; (c) VLSI optical interconnection of computers, which requires rapidly reprogrammable spatial light modulators (SLM) to holographically interconnect optical sources and detectors on a VLSI chip. The holographic processor chip developed for the vision system in this task can also be used to solve one bottleneck—that of generating the SLM program input in real-time.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

I claim:

1. A display system apparatus for generating a visual display from an electrical driver signal comprising:
    a signal source providing a frequency multiplexed tricolor electrical driver signal comprising a sum of three separate video signals modulated on three respective radio frequency carrier signals;
    a light source providing a linearly polarized, pulsed input light beam including red, green, and blue wavelengths;
    an acousto-optic tunable filter arranged to receive and be driven by said frequency multiplexed tricolor driver signal;
    a scanning mirror positioned to receive said light beam and scan it across said acousto-optic tunable filter; and
    wherein said filter produces an output beam in response to said driver signal and said light beam, and further including a beam splitter means for receiving said output beam, for separating it into an undifracted zero order beam and a first order component, and for selecting the undiffracted zero order beam as the display to be viewed.

2. The display apparatus of claim 1 wherein said driver signal further comprises modulated red, green, and blue video signals.

3. The display apparatus of claim 2 wherein said light beam comprises a collimated laser beam.

4. The display apparatus of claim 3 wherein said collimated laser beam is generated by a helium cadmium laser.

5. The display apparatus of claim 1 wherein said zero order beam is focused directly on the retina of a viewer.

6. A method of providing a color display, comprising the steps of:
    scanning a linearly polarized light beam across an acousto-optic tunable filter;
    driving said tunable filter with an electrical driver signal comprising frequency modulated red, green, and blue video signals that are modulated on three respective carrier signals, wherein a frequency of each of the red, green, and blue carrier signals is selected to correspond to red, green, and blue spectral lines of the linearly polarized light beam;
    splitting the output of said tunable filter into first and zero order components; and
    selecting said zero order component to provide said display, wherein a cell aperture of said tunable filter is successively filled with a succession of encoded vertical video scan lines by said driver signal and said light beam is pulsed to periodically illuminate the filled filter.

7. The method of claim 6, further including the step of focusing said zero order component directly to the retina of the eye of a viewer.

8. A display system apparatus for generating a visual display from an electrical signal comprising:
    a signal source means for providing a multiplexed tricolor electrical driver signal having three separate frequency components therein at any given time and representing an output scene to be displayed;
    a light source means for providing a linearly polarized, pulsed input light beam;
    an acousto-optic tunable filter means for receiving and being driven by said multiplexed tricolor driver signal; and
    means positioned to receive said light beam from said light source for scanning said light beam across said acousto-optic tunable filter means so as to generate an output beam from said filter means having a representation of said output scene present in an undiffracted zero order output portion thereof; and
    means for selecting said undiffracted zero order output portion to provide said display,
    wherein said light source comprises a laser means providing red, green, and blue wavelengths, and wherein said signal source means and means for scanning cause said filter means to implement three spectral band-pass filters centered at said red, green, and blue wavelengths, respectively,
    wherein said means for selecting comprises beam splitter means for receiving said output beam, separating it into a zero order beam and a first order component, and providing the undiffracted zero order beam to the eye of a viewer.

9. The apparatus of claim 8 wherein said beam splitter means further overlays a real world scene on said display.

10. The apparatus of claim 9 wherein said real world scene is a real-time real world scene.

11. A display system apparatus for generating a visual display comprising:
    laser means providing a linearly polarized, pulsed input light beam including red, green, and blue wavelengths;

a signal source means for providing a multiplexed tricolor electrical driver signal representing an output scene to be displayed, said driver signal including three simultaneously added carrier signals with respective wavelengths equal to said red, green, and blue wavelengths, respectively;

an acousto-optic tunable filter means for receiving and being driven by said multiplexed tricolor driver signal, said multiplexed tricolor driver signal successively filling an aperture of the filter means with an encoded vertical scan line; and means positioned to receive said light beam from said light source for scanning said light beam across said acousto-optic tunable filter means to illuminate said filter during a presence of each successive scan line, so as to generate an output beam from said filter means having a representation of said output scene present in an undiffracted zero order output portion thereof.

12. The display system of claim 11 further including:
means for selecting said undiffracted zero order output portion for use as said visual display.

13. The display system of claim 10 wherein said filter means implements three spectral band-pass filters centered at said red, green, and blue wavelengths.

14. A method of providing a color display, comprising the steps of:
driving an acousto-optic tunable filter with an electrical driver signal comprising frequency modulated red, green, and blue video signals that are modulated on three respective carrier signals, wherein a frequency of each of the red, green, and blue carrier signals is selected to correspond to red, green, and blue spectral lines of the linearly polarized light beam;

successively filling a cell aperture of said filter with an encoded vertical scan line of the electrical driver signal;

scanning a pulse of linearly polarized, collimated light across said filter to illuminate said filter during the presence of each successive scan line;

splitting the output of said tunable filter into first and zero order components; and selecting said zero order component to provide said display.

* * * * *